(12) United States Patent
Noh

(10) Patent No.: US 7,773,752 B2
(45) Date of Patent: Aug. 10, 2010

(54) CIRCUITS, APPARATUS, METHODS AND COMPUTER PROGRAM PRODUCTS FOR PROVIDING CONDITIONAL ACCESS AND COPY PROTECTION SCHEMES FOR DIGITAL BROADCAST DATA

(75) Inventor: Mi jung Noh, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1540 days.

(21) Appl. No.: 11/062,544

(22) Filed: Feb. 22, 2005

(65) Prior Publication Data

US 2005/0190917 A1    Sep. 1, 2005

(30) Foreign Application Priority Data

Feb. 26, 2004   (KR) ............... 10-2004-0012990

(51) Int. Cl.
 H04N 7/167 (2006.01)
 H04N 7/16 (2006.01)
(52) U.S. Cl. ............... 380/239; 380/200; 726/26; 725/25
(58) Field of Classification Search ........... 380/239, 380/200; 726/26; 725/25
 See application file for complete search history.

(56) References Cited

U.S. PATENT DOCUMENTS

| 5,870,474 | A  | * | 2/1999 | Wasilewski et al. ......... 380/211 |
|---|---|---|---|---|
| 6,223,285 | B1 |   | 4/2001 | Komuro et al. |
| 6,263,313 | B1 | * | 7/2001 | Milsted et al. ................ 705/1 |
| 6,351,538 | B1 |   | 2/2002 | Uz ............................. 380/201 |
| 6,381,747 | B1 |   | 4/2002 | Wonfor et al. .............. 725/104 |
| 6,545,722 | B1 |   | 4/2003 | Schultheiss et al. ......... 348/552 |
| 6,674,858 | B1 | * | 1/2004 | Kimura et al. ............. 380/202 |
| 6,738,905 | B1 | * | 5/2004 | Kravitz et al. .............. 713/194 |
| 6,741,991 | B2 | * | 5/2004 | Saito ............................ 707/9 |
| 6,927,806 | B2 | * | 8/2005 | Chan .......................... 348/731 |
| 7,093,295 | B1 | * | 8/2006 | Saito .......................... 726/26 |
| 7,200,868 | B2 | * | 4/2007 | Mattox et al. ................ 726/26 |
| 2002/0114455 | A1 | * | 8/2002 | Asahi et al. ................ 380/201 |
| 2003/0174844 | A1 | * | 9/2003 | Candelore .................. 380/277 |

FOREIGN PATENT DOCUMENTS

| FR | 2 732 537 | 10/1996 |
|---|---|---|
| KR | 10-2003-0047253 | 6/2003 |

(Continued)

OTHER PUBLICATIONS

Chinese Patent Application No. 200510074126.4, Office Action dated Dec. 7, 2007.

(Continued)

*Primary Examiner*—Kambiz Zand
*Assistant Examiner*—William S Powers
(74) *Attorney, Agent, or Firm*—Myers Bigel Sibley & Sajovec

(57) ABSTRACT

A digital broadcast video receiving circuit includes a plurality of decoder circuits configured to decode an encoded digital broadcast video signal according to respective plurality of encoding formats to provide a digital data packet based on the encoded digital broadcast video signal. An encoding circuit is coupled to the plurality of decoder circuits and is configured to encode the digital data packet to provide a re-encoded digital data packet, related methods, and computer program products.

29 Claims, 5 Drawing Sheets

FOREIGN PATENT DOCUMENTS

| | | |
|---|---|---|
| WO | WO 99/16244 A1 | 4/1999 |
| WO | WO 99/35647 | 7/1999 |
| WO | WO 00/04717 | 1/2000 |
| WO | WO 01/26372 | 4/2001 |
| WO | WO 01/37562 | 5/2001 |

OTHER PUBLICATIONS

Search Report for Netherlands Patent Application No. 1028324; Date of mailing May 31, 2006.

Notice to Submit a Response for Korean Patent Application No. 10-2004-0012990 mailed on Sep. 28, 2005.

* cited by examiner

CIRCUITS, APPARATUS, METHODS AND COMPUTER PROGRAM PRODUCTS FOR PROVIDING CONDITIONAL ACCESS AND COPY PROTECTION SCHEMES FOR DIGITAL BROADCAST DATA

CROSS-REFERENCE TO RELATED APPLICATION

This application claims the priority of Korean Patent Application No. 2004-12990, filed on Feb. 26, 2004, in the Korean Intellectual Property Office, the disclosure of which is incorporated herein in its entirety by reference.

FIELD OF THE INVENTION

The present invention relates to digital data processing, and more particularly, to encoding/decoding of digital video data.

BACKGROUND

As broadcasting content become digitzed, the protection of the broadcasting contents may become more important. For example, the proliferation of Digital Television may be promoted by the existence of a copy protection device and/or a conditional access device that allows only an authorized user to view the digital broadcast content.

Digital content is encoded at a broadcasting station using a secret key so that the transmitted digital broadcast content may be viewed by only an authorized viewer (i.e., a user that has access to the secret key used to encode the content. The content can be decoded (e.g., in a digital TV) using the secret key, thereby allowing the content to be viewable. It is known to provide some of the above in a "conditional access device" associated with a digital TV.

Further, the digital TV may include a copy protection device to protect against unauthorized copying. In the copy protection device, the content is encoded using the secret key provided in the digital TV when the received digital broadcasting content is stored in a predetermined storage unit, and the stored broadcasting content is decoded using the secret key when the stored broadcasting contents are again viewed (or reproduced).

However, some conventional conditional access devices of the digital TV receive the digital broadcasting contents over a limited channel, decode, and store the content without encoding.

SUMMARY

Embodiments according to the invention can provide circuits, apparatus, methods and computer program products for providing conditional access and copy protection schemes for digital broadcast data. Pursuant to these embodiments, a digital broadcast video receiving circuit can include a plurality of decoder circuits configured to decode an encoded digital broadcast video signal according to respective plurality of encoding formats to provide a digital data packet based on the encoded digital broadcast video signal. An encoding circuit is coupled to the plurality of decoder circuits and is configured to encode the digital data packet to provide a re-encoded digital data packet.

In some embodiments according to the invention, the digital broadcast video receiving circuit is a set-top box. In some embodiments according to the invention, the digital broadcast video receiving circuit is a high definition television. In some embodiments according to the invention, the digital broadcast video receiving circuit is a digital personal video recorder. In some embodiments according to the invention, the encoding format can be a Data Encryption Standard (DES), a Triple Data Encryption Standard (TDES), a Common Scramble Algorithm standard (CSA), and/or an Advanced Encryption Standard (AES).

In some embodiments according to the invention, a storage device is coupled to the encoding circuit and is configured to store the re-encoded digital data packet. In some embodiments according to the invention, a secret-key process circuit is coupled to the plurality of decoder circuits and is configured to store/retrieve secret keys associated with the plurality of decoder circuits. In some embodiments according to the invention, the secret-key process circuit includes an index generation circuit that is coupled to the plurality of decoder circuits and is configured to receive a packet identifier associated with one of the plurality of decoder circuits and is configured to provide a key index therefrom. A codeword table interface circuit is coupled to the index generation circuit and is configured to provide a key request based on the key index. A codeword table circuit is coupled to the codeword table interface circuit and is configured to provide secret-keys to an enabled one of the plurality of decoder circuits responsive to the key request.

In some embodiments according to the invention, an input interface circuit is coupled to the plurality of decoder circuits and is configured to provide a packet identifier there to enable one of the plurality of decoder circuits with which packet identifier is associated, and is configured to provide the encoded digital broadcast video signal to the one of the plurality of decoder circuits. The one of the plurality of decoder circuits is further configured to request a secret-key based on the packet identifier to decode the encoded digital broadcast video signal using the secret-key.

In some embodiments according to the invention, the encoding circuit is further configured to access a secret-key to re-encode the decoded digital data packet using one of the plurality of encoding formats. In some embodiments according to the invention, the secret-key is provided via a smart card and/or a random number generator circuit coupled to the digital broadcast video receiving circuit.

In some embodiments according to the invention, the plurality of decoder circuits further include a first one of the plurality of decoder circuits comprising an output therefrom coupled to an input of a second one of the plurality of decoder circuits, wherein the first one operates in a bypass mode to pass encoded digital data packets received from a storage device to the encoding circuit. The encoding circuit is configured to encode the encoded digital data packets to provide twice encoded digital data packets using a secret-key accessed via a codeword table based on a packet identifier associated with the encoded digital data packets.

In some embodiments according to the invention, the secret-key is a first secret-key and wherein the encoded digital broadcast video signal is encoded using a second secret-key different than the first secret-key. In some embodiments according to the invention, a second one of the plurality of decoder circuits is coupled to an output of the first one of the plurality of decoder circuits and the first one of the plurality of decoder circuits is configured to decode the twice encoded digital data packets provided from the storage device using the first secret-key to provide once decoded digital data packets to the second one of the plurality of decoder circuits. The second one of the plurality of decoder circuits is configured to decode the once decoded digital data packets using the second secret-key to provide the decoded digital data packets.

In some embodiments according to the invention, an apparatus for providing conditional access and copy protection includes a decoder circuit and an input interface circuit, coupled to the decoder circuit, that is configured to receive encoded digital data packets transmitted according to a digital TV transmission standard, and to output a packet identifier included in the received encoded digital data packets to the decoder circuit. A secret-key process unit is coupled to the input interface circuit, and is configured to transmits a first secret-key corresponding to the packet identifier to the decoder circuit, to provide decoded digital data packets from the decoding unit. A write interface circuit is coupled to the decoder circuit and is configured to receive the decoded digital data packets from the decoder circuit and provide the decoded digital data packets based on the packet identifier in response to a record signal. An encoding circuit is coupled to the write interface circuit and is configured to receive the decoded digital data packets from the write interface circuit and to receive a second secret-key associated with the packet identifier from the secret-key process circuit, and is further configured to encode the received decoded digital data packets using the second secret-key to provide re-encoded digital data packets to the write interface circuit. A storage unit is coupled to the write interface circuit and is configured to store/retrieve the re-encoded digital data packets.

In some embodiments according to the invention, a method for receiving digital broadcast video includes decoding an encoded digital broadcast video signal according using one of a plurality of encoding formats used to encode the encoded digital broadcast video signal to provide a digital data packet based on the encoded digital broadcast video signal. The digital data packet is re-encoded to provide a re-encoded digital data packet.

In some embodiments according to the invention, a computer program product for receiving digital broadcast video includes a computer readable medium having computer readable program code embodied therein. The computer readable program product includes computer readable program code configured to decode an encoded digital broadcast video signal using one of a plurality of encoding formats used to encode the encoded digital broadcast video signal to provide a digital data packet based on the encoded digital broadcast video signal. Computer readable program code is configured to encode the digital data packet to provide a re-encoded digital data packet.

DESCRIPTION OF EMBODIMENTS ACCORDING TO THE INVENTION

Figure 1:
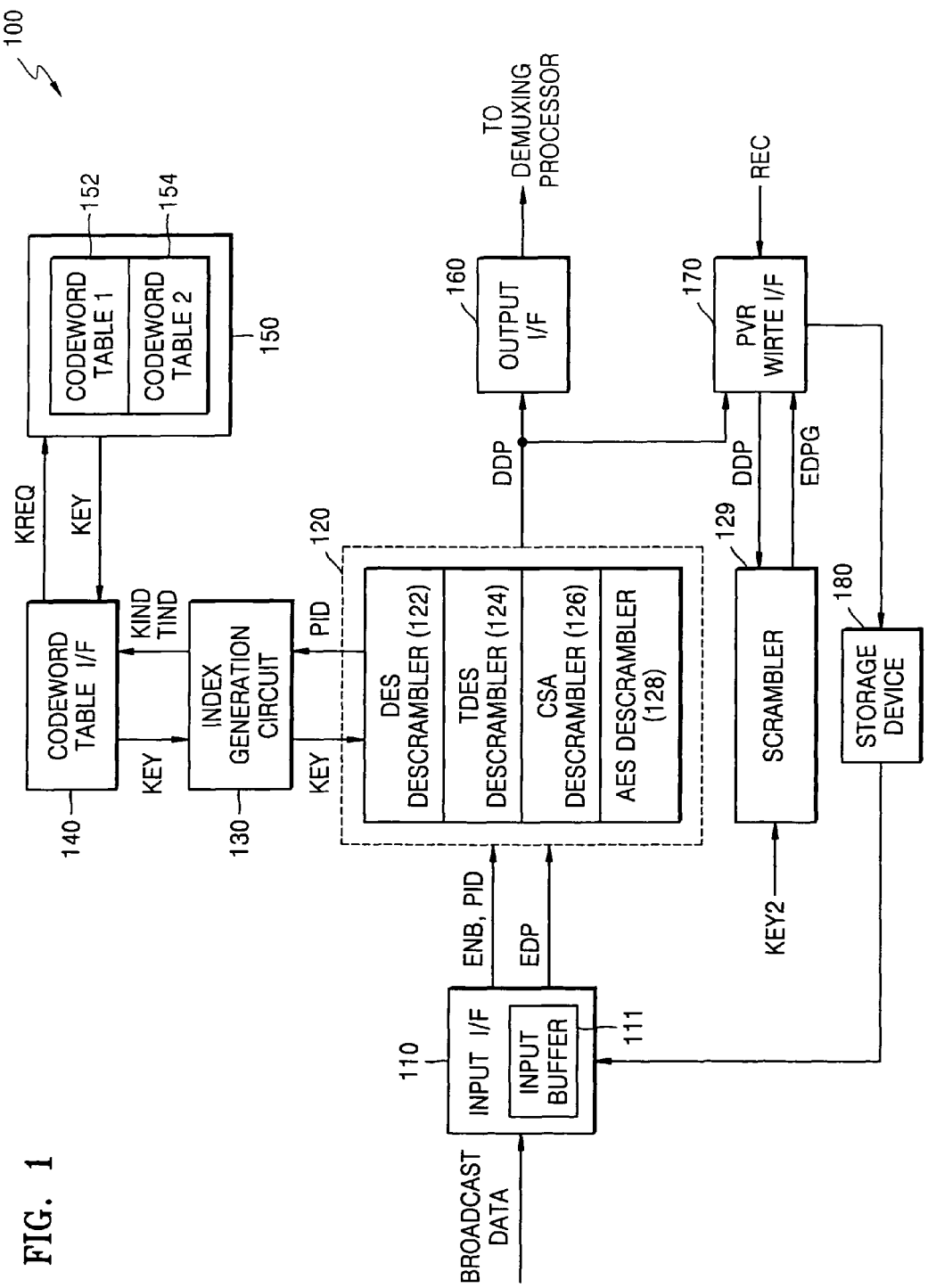
FIG. 1 is a block diagram illustrating circuits, apparatus, methods, and/or computer program products for providing conditional access and copy protection in some embodiments according to the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention may be embodied as circuits, apparatuses, methods, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the drawings. For example, two blocks shown in succession may in fact be executed substantially concurrently or the blocks may sometimes be executed in the reverse order, depending upon the functionality/acts involved.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the blocks of the Figures.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams.

Embodiments according to the invention can operate in a logically separated client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

It will be further understood that the present invention can be embodied as a digital television, a set-top box, a digital video recorder, etc., as well as a combination of these components. Set-top boxes are disclosed, for example, in U.S. Pat. No. 6,545,722, to Schultheiss, et al., entitled Methods and Systems for Providing Television Related Services via a Networked Personal Computer, the content of which is incorporated herein by reference.

FIG. 1 is a block diagram illustrating circuits, apparatus, methods, and/or computer program products for providing conditional access and copy protection in some embodiments according to the present invention. Referring to FIG. 1, the circuit (or apparatus) 100 can be used, for example, in a digital television (TV), and can be embodied as a System on Chip (SoC). The apparatus 100 includes an input interface 110; a decoding block (or decoder circuit) 120; an encoding device (or encoder circuit) 129, an index generation circuit 130, a codeword table interface circuit 140; a codeword table 150; an output interface circuit 160; a Personal Video Recorder (PVR) write interface circuit 170; and a storage device 180.

The input interface circuit 110 receives and stores broadcast data (BD) from a broadcasting station according to a digital TV transmission standard. The broadcast data (BD) is a data packet encoded according to a Data Encryption Standard (DES), a Triple DES (TDES), a DVB-Common Scramble Algorithm (CSA), or an Advanced Encryption Standard (AES). Further, when the broadcast data stored in the storage device 180 is reproduced (i.e., retrieved from the storage device 180), the input interface circuit 110 receives and stores an encoded digital data packet from the storage device 180.

When one packet (188 bytes) of a Moving Picture Experts Group (MPEG) stream or one packet (130 bytes) of a Digital Signature Standard (DSS) stream is stored in an input buffer 111 of the input interface circuit 110, the input interface circuit 110 detects a Packet identification or packet identifier (PID) of the packet stored in the input buffer 111, generates an enable signal (ENB) on the basis of the detected PID, and outputs the PID and the enable signal (ENB) to the decoding block 120.

Accordingly, the enable signal (ENB) is concurrently used as a signal for selecting one of a plurality of descramblers (or decoders circuits) 122, 124, 126 and 128 and as a signal for enabling the one selected descrambler. In some embodiments according to the invention, the decoding block 120 includes decoder circuits that are compliant with any of the following encoding formats: a DES descrambler 122, a TDES descrambler 124, a CSA descrambler 126 and an AES descrambler 128. The decoding block 120 is exemplified as four descramblers (122 to 128) for convenience, however, more or fewer descramblers may be used.

The scrambler 129 can be embodied as any one of a DES scrambler, a TDES scrambler, a CSA scrambler and an AES scrambler, or another device compliant with another type of encoding format.

Each of the descramblers 122, 124, 126 and 128 is an example of a decoder circuit, and the scrambler 129 is an example of the encoding circuit. Accordingly, in some embodiments according to the invention, at least one decoder circuit and at least one encoder circuit is included.

The DES descrambler 122 descrambles broadcast contents that are scrambled according to the DES. The TDES descrambler 124 descrambles ATSC broadcast contents that are scrambled according to the TDES. The CSA descrambler 126 descrambles broadcast contents that are scrambled according to the CSA. The AES descrambler 128 descrambles broadcast contents that are scrambled according to the AES. The scrambler 129 scrambles the broadcast contents according to a scrambling method, that is, the DES, the TDES, the CSA or the AES when the received broadcast contents are stored in the storage device 180.

Therefore, in some embodiments according to the invention, the broadcast contents are stored in an encoded form, thereby protecting against unauthorized copying of the digital broadcast contents. In other words, in some embodiments according to the invention, the circuit/apparatus 100 provides the conditional access scheme by using any one of the DES descrambler 122, the TDES descrambler 124, the CSA descrambler 126 and the AES descrambler 128, and provides the copy protection using the scrambler 129.

In some embodiments according to the invention, only one of the DES descrambler 122, the TDES descrambler 124, the CSA descrambler 126, and the AES descrambler 128 is enabled in response to the enable signal (ENB). However, as shown in embodiments illustrated, for example, by FIG. 5, one descrambler is enabled in response to the enable signal (ENB), but two descramblers can also be substantially enabled through an internal operation.

Accordingly, in some embodiments according to the invention, a device can receive and decode all broadcast data transmitted from the broadcast station, irrespective of various digital TV transmission standards.

The descramblers 122 to 128, which are enabled in response to the enable signal (ENB), receive the packet identification (PID) and transmit the received packet identification (PID) to the index generation circuit 130. The index generation circuit 130 includes at least one register file. The register file has a secret key index (KIND) and a secret key table index (TIND). Accordingly, the index generation circuit 130 generates the secret key index (KIND) and the secret key table index (TIND), and transmits the generated indexes (KIND) and (TIND) to the codeword table interface 140.

The codeword table interface 140 transmits a key requirement signal (KREQ) requiring a secret key (KEY) to the codeword table 150, on the basis of the secret key index (KIND) and the secret key table index (TIND), and the codeword table interface 140 receives the secret key (KEY) from the codeword table 150 on the basis of the key requirement signal (KREQ), and transmits the received secret key (KEY) to the index generation circuit 130.

In some embodiments according to the invention, the codeword table 150, which is a memory for storing the secret key, includes a first codeword table 152 and a second codeword table 154. The first codeword table 152 is a memory for storing a first secret key set by a CPU (Central Processing Unit), whereas the second codeword table 154 is a memory for storing a second secret key, which is generated by a random number generator (not shown), a smart card provided from the broadcasting station, or the like.

In some embodiments according to the invention, a secret-key process unit (or circuit) can include the index generation circuit 130, the codeword table interface 140, and the codeword table 150. Accordingly, the secret-key process unit includes a plurality of secret keys. The secret-key process unit transmits a corresponding one (KEY) of the plurality of selected secret keys to the enabled descrambler, in response to the key requirement signal (KREQ) based on the packet identification (PID) that is output from the enabled one of the plurality of descramblers 122 to 128.

One descrambler 122, 124, 126 or 128 enabled in response to the enable signal (ENB) receives the secret key (KEY) from the index generation circuit 130, and stores the received secret key (KEY) in a predetermined storage device associated with the descramblers 122 to 128. The secret key (KEY) may be stored in the predetermined storage device before the enabled descrambler receives one packet (EDP) to descramble the received packet.

Accordingly, the one enabled descrambler 122, 124, 126 or 128 descrambles one scrambled packet (EDP) in a predetermined unit by using the secret key, and transmits the descrambled packet or decoded digital data packet (DDP) to the output interface 160 and the PVR write interface 170.

In other words, each of the descramblers 122 to 128 includes a First-Input-First-Output (FIFO) (not shown) for storing a basic unit of data, for each of the decoder circuits. Accordingly, if the basic process unit of data is stored in an input FIFO, each of the descramblers 122 to 128 descrambles and stores the basic process unit of data in an output FIFO (not shown), and transmits the descrambled packet (DDP) to the output interface 160 and the PVR write interface 170.

For example, in some embodiments according to the invention, each of the DES descrambler 122 and the TDES descrambler 124 can descramble data in a 64-bit unit, the CSA descrambler 126 can descramble data in a 8-bit unit, and the AES descrambler 128 can descramble data in a 128-bit unit. Further, since the scrambler 129 can be embodied using the DES, the TDES, the CSA or the AES, a processed scramble unit is determined according to a method of embodying the scrambler 129.

The output interface 160 receives and stores the packet (DDP) decoded through the decoding block 120, and transmits the stored packet to a demuxing processor.

The PVR write interface 170 monitors the packet identifier included in the packet (DDP) output from the decoding block 120, while transmitting the descrambled packet (DDP) with the PID to be recorded, to the scrambler 129, in response to a record command (REC).

As in the above decoding, the scrambler (or encoder circuit) 129 uses the secret key from the codeword table 150 associated with the packet identifier included in the received packet (DDP), and stores (or sets) the secret key in the predetermined storage device provided in the scrambler 129.

In some embodiments according to the invention, the scrambler 129 may finish an operation of storing the secret key before it receives the basic process unit of data. As described above, the scramble unit of the scrambler 129 is determined according to the method of embodying the scrambler 129. For example, in some embodiments according to the invention, where the scrambler 129 is embodied as the AES scrambler, the scrambler 129 scrambles the packet (DDP) received in the 128-bit unit. Accordingly, the scrambler 129 uses the secret key taken from the codeword table 150 to again scramble (i.e., re-encode) the packet (DDP) decoded by the decoding block 120 and store the scrambled packet (EDPG) in the storage device 180 through the PVR write interface 170. In some embodiments according to the invention, the storage device 180 can be embodied as a Hard Disc Drive (HDD), but is not limited to the HDD.

Figure 2:
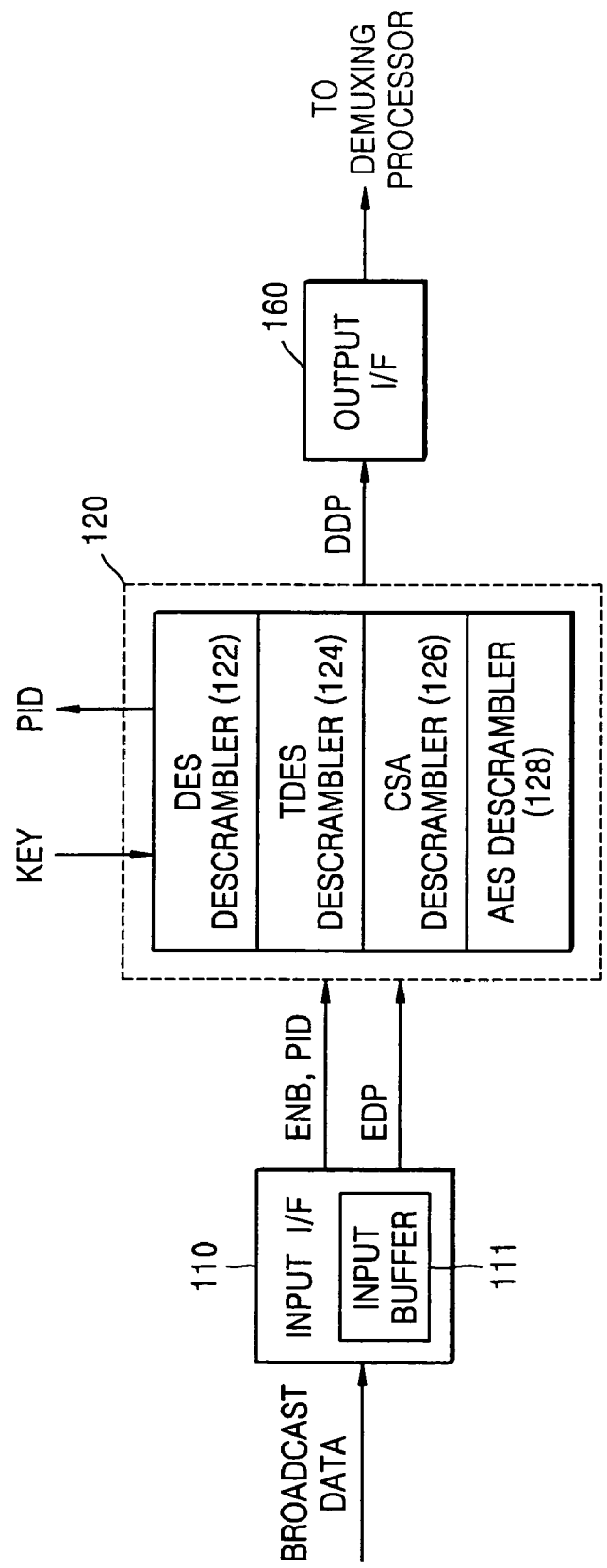
FIG. 2 is a block diagram illustrating circuits, apparatus, methods, and/or computer program products for decoding received broadcast data in some embodiments according to the present invention.

FIG. 2 is a block diagram illustrating circuits, apparatus, methods, and/or computer program products for decoding received broadcast data in some embodiments according to the present invention. Referring to FIGS. 1 and 2, decoding the received broadcast data is described in detail. In a case where the broadcast data (BD), which is transmitted from the broadcasting station according to the digital TV transmission standard, is the scrambled packet using any one of the DES, the TDES, the DVB-CSA and the AES encoding formats, the input interface 110 receives and stores the scrambled packet, which is transmitted according to the methods, in the input buffer 111, and transmits the packet identification (PID) and the enable signal (ENB), which is generated on the basis of the packet identification, to the decoding block 120. The input interface 110 can detect on the basis of the packet identification (PID) whether the scrambled packet is generated according to any digital TV transmission standard. Accordingly, only one of the descramblers 122 to 128 is enabled in response to the enable signal (ENB).

After the one enabled descrambler 122, 124, 126 or 128 receives the packet identification (PID), and transmits the received packet identification (PID) to the index generation circuit 130, it receives and stores the secret key (KEY) taken from the codeword table 150 by the index generation circuit 130 and the codeword table interface 140.

The one enabled descrambler 122, 124, 126 or 128 uses the secret key (KEY) to descramble the scrambled packet (EDP), which is input through the input interface 110, and transmits the descrambled packet (DDP) to the output interface 160. Additionally, the content can be viewed through a reproduction process of the broadcast data (BD).

Figure 3:
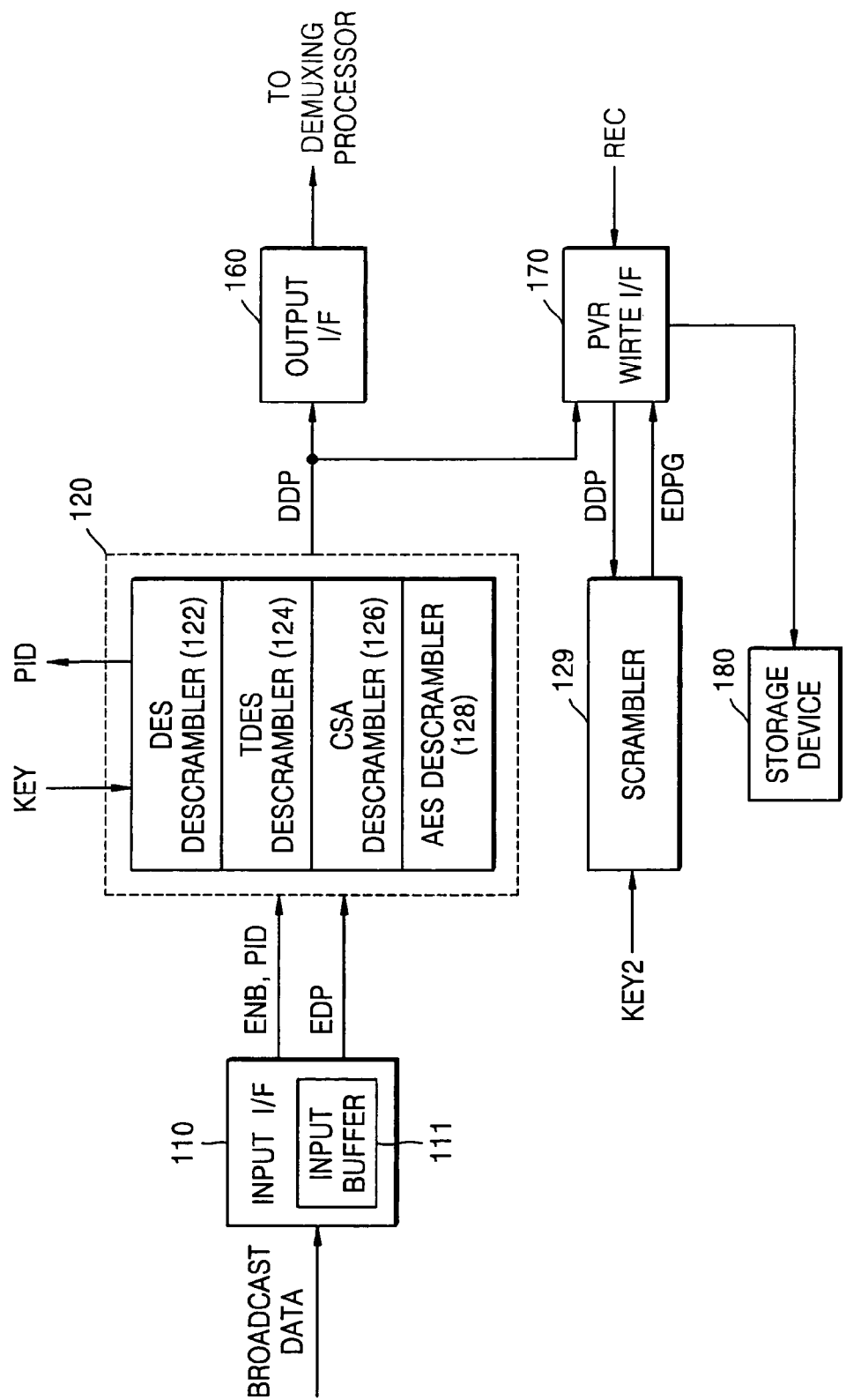
FIG. 3 is a block diagram illustrating circuits, apparatus, methods, and/or computer program products for storing received broadcast data in a storage unit in some embodiments according to the present invention.

FIG. 3 is a block diagram illustrating circuits, apparatus, methods, and/or computer program products for storing received broadcast data in a storage unit in some embodiments according to the present invention. Referring to FIGS. 1 and 3, storing (or writing) the broadcast data (BD), which is received by the digital TV, in the storage device 180 is described in detail.

The one enabled descrambler 122, 124, 126 or 128 descrambles the packet (EDP), which is scrambled using the stored secret key, through the process described with reference to FIGS. 1 and 2, and transmits the descrambled packet (DDP) to the output interface 160 and the PVR write interface 170.

The PVR write interface 170 monitors the packet identification (PID) of the descrambled packet (DDP), while transmitting to the scrambler 129 the descrambled packet (DDP) to be recorded in response to the record command (REC). Since the PVR write interface 170 has a stored code, which is set for record by an external CPU, it transmits to the scrambler 129 only the descrambled packet (DDP) with the identification corresponding to the code. For example, the digital TV generates a command for storing (writing) the received broadcast data (BD) in the storage device 180, by using the record command (REC).

The scrambler 129 receives and stores the secret key (KEY2) corresponding to the packet identification included in the received packet (DDP) through mutual operations of the index generation circuit 130, the codeword table interface 140 and the codeword table 150. After that, the scrambler 129 scrambles the packet (DDP) to be stored in the storage device 180 by using the secret key (KEY2), and transmits the scrambled packet (EDPG) to the PVR write interface 170.

The PVR write interface 170 receives the scrambled packet or encoded digital data packet (EDPG) and transmits the received packet to the storage device 180. After the secret key (KEY2) is stored in the storage device 180, it is stored in the second codeword table 154. Accordingly, the broadcast data (BD) received at the digital TV is stored in the storage device 180 through the decoding and encoding operations described with reference to FIGS. 1 through 3. In this case, only one of descramblers 122, 124, 126 and 128 and only the scrambler 129 are driven at the same time.

Figure 4:
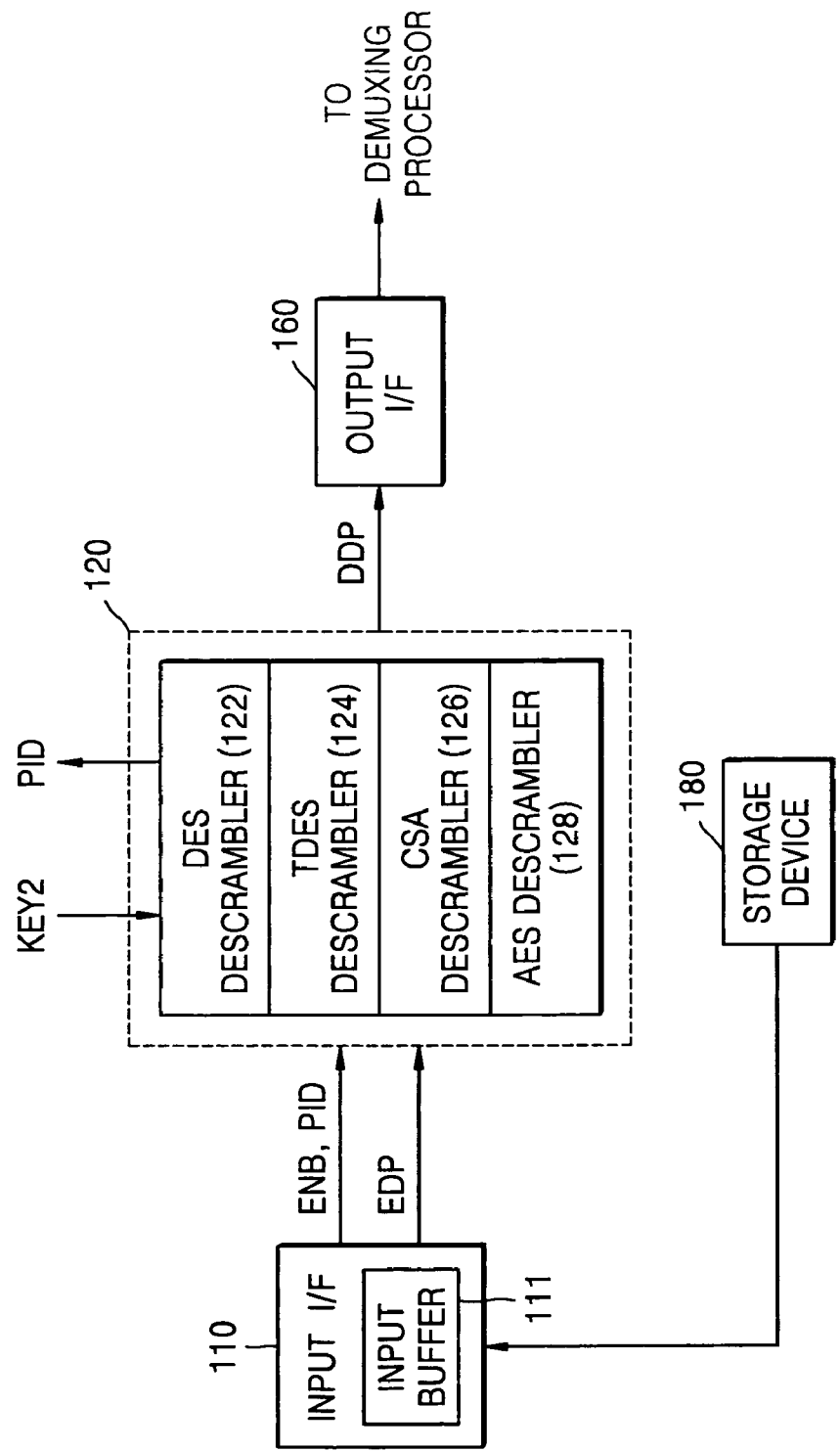
FIG. 4 is a block diagram illustrating circuits, apparatus, methods, and/or computer program for decoding broadcast data stored in a storage unit in some embodiments according to the present invention.

FIG. 4 is a block diagram illustrating circuits, apparatus, methods, and/or computer program for decoding broadcast data stored in a storage unit in some embodiments according to the present invention. Referring to FIGS. 3 and 4, a decoding the broadcast data stored in the storage device 180 is described in detail.

The scrambled packet (EDP) described with reference to FIG. 3 is stored in the storage device 180. Accordingly, the packet scrambled using at least one of AES scrambling, DES scrambling, TDES scrambling and CSA descrambling is stored in the storage device 180.

The input interface 110 receives and stores the packet of the scrambled broadcast data from the storage device 180. The input interface 110 transmits the identifier (PID) of the received packet, and the enable signal (ENB) generated on the basis of the identifier (PID) of the packet, to the decoding block 120. The decoding block 120 decodes the packet output from the input interface 110 as described above with reference to FIG. 2.

For example, in some embodiments according to the invention, where the packet is scrambled using the AES scrambling is stored in the storage device 180, the AES descrambler 128 is enabled in response to the enable signal (ENB) output from the input interface 110. Accordingly, the AES descrambler 128 takes and stores the secret key (KEY2) corresponding to the packet identification (PID) from the codeword table 150 through the index generation circuit 130 and the codeword table interface 140. The AES descrambler 128 descrambles the packet of the broadcast data, which is stored in the storage device 180, by using the secret key (KEY2), and transmits the descrambled packet (DDP) to the output interface 160. In this case, only the AES scrambler 128 is driven.

Figure 5:
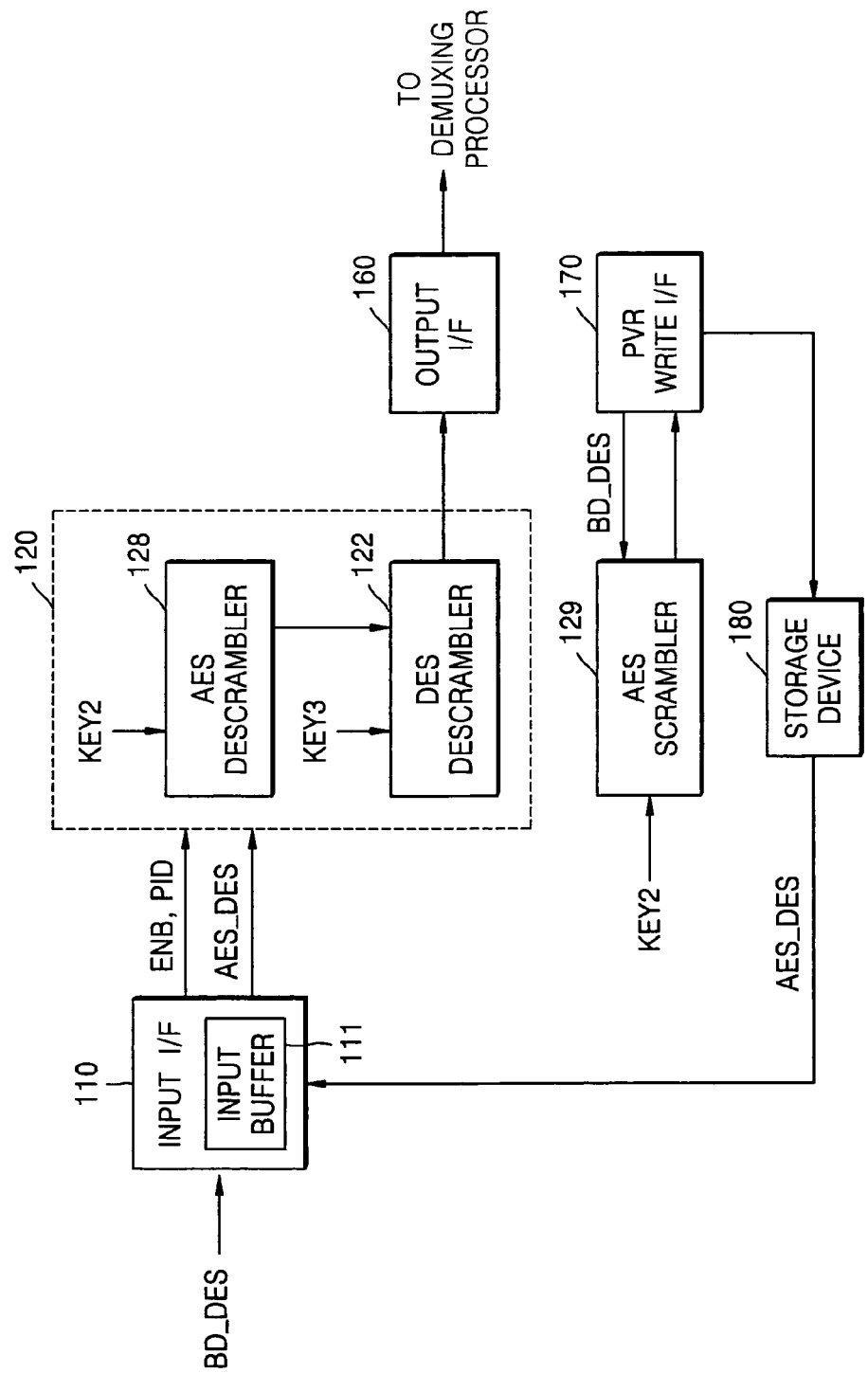
FIG. 5 is a block diagram illustrating circuits, apparatus, methods, and/or computer program products for decoding broadcast data stored in a storage unit, using a later-generated secret key in some embodiments according to the present invention.

FIG. 5 is a block diagram illustrating circuits, apparatus, methods, and/or computer program products for decoding broadcast data stored in a storage unit, using a later-generated secret key in some embodiments according to the present invention. Referring to FIGS. 1 and 6, decoding the stored broadcast data by using the later-generated secret key, is described.

With respect to discussion below (FIGS. 1 & 6), it is assumed that the received broadcast data is broadcast data (BD_DES) scrambled according to the DES, the codeword table 150 does not have the secret key for descrambling the broadcast data (BD_DES) scrambled according to the DES, and the scrambler 129 is the AES scrambler.

Accordingly, the enabled DES descrambler 122 does not descramble the broadcast data (BD_DES) scrambled according to the DES. Therefore, the enabled DES descrambler 122 outputs the broadcast data (BD_DES) as it is. This process is called "scrambled broadcast data (BD_DES) is bypassed." Accordingly, the PVR write interface 170 transmits the packet of the broadcast data (BD_DES) scrambled according to the DES (encoded digital data packet), that is, the packet of the received broadcast data (BD_DES), to the AES scrambler 129 in response to the record command.

The AES scrambler 129 again scrambles the DES dependent scrambled broadcast data (BD_DES) according to the AES, by using the secret key (KEY2) stored in the codeword table 150 corresponding to the packet identification (to provide twice encoded digital data packets), and stores the AES dependent scrambled broadcast data in the storage device 180 through the PVR write interface 160. The secret key (KEY2) is stored in the storage device 180.

In some embodiments according to the invention, where a secret key (KEY3) (Hereinafter, referred to as "later-generated secret key") for descrambling the broadcast data (BD_DES) scrambled using the DES is obtained to reproduce the broadcast data stored in the storage device 180, the input interface 110 stores the packet of the broadcast data output from the storage device 180 in the input buffer 111, and transmits the identification (PID) of the packet and the enable signal (ENB) generated on the basis of the identification (PID) of the packet, to the AES descrambler 128.

The later-generated secret key (KEY3) can be loaded in the broadcast data and provided by the broadcasting station, or can be provided from a separate smart card. The later-generated secret key (KEY3) is stored in the second codeword table 154.

The enabled AES descrambler 128 descrambles the (twice encoded digital data packet of the broadcast data (BD_DES) transmitted from the input interface 110, by using the secret key (KEY2) to provide once encoded digital data packets, and transmits the descrambled packet to the DES descrambler 122. The secret key (KEY2) is taken from the codeword table 150 through the index generation circuit 130 and the codeword table interface 140, on the basis of the packet identification (PID).

The DES descrambler 122 descrambles the packet output from the AES descrambler 128 to provide decoded digital data packets, by using the later-generated secret key (KEY3), and outputs the descrambled packet to the output interface 160. In this case, two descramblers are driven at the same time. This can be achieved because there is a direct path between the descramblers. An operation of taking the secret keys (KEY2 and KEY3) from the codeword table 150 is described with reference to FIGS. 1 through 4.

The inventive apparatus including at least one decoding device and at least one encoding device performs a method of conditional access and copy protection for the digital TV signal. Furthermore, programs can be stored in a computer-readable recording medium to perform respective processes of the conditional access and copy protection method.

As described above, in some embodiments according to the invention, the circuits, apparatus, method, and computer program products for providing the conditional access and copy protection schemes can decode, in real time, the digital broadcast contents that are encoded according to any digital TV transmission standard. Accordingly, in some embodiments according to the invention, such circuits, apparatus, method, and computer program products can be used irrespective of digital TV broadcasts employing different methods (for example, an ATSC method and a DVB method).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed:

1. A digital broadcast video receiving circuit comprising:
    a plurality of decoder circuits configured to decode an encoded digital broadcast video signal according to respective plurality of encoding formats to provide a digital data packet based on the encoded digital broadcast video signal;
    an encoding circuit, coupled to the plurality of decoder circuits, configured to encode the digital data packet to provide a re-encoded digital data packet; and
    a secret-key process circuit, coupled to the plurality of decoder circuits, configured to store/retrieve secret keys associated with the plurality of decoder circuits and the encoding circuit,
    wherein the encoding circuit uses a secret key retrieved from the secret-key process circuit to encode the digital data packet and store the re-encoded digital data packet in a storage device, and
    wherein the secret-key process circuit comprises:
    an index generation circuit, coupled to the plurality of decoder circuits, configured to receive a packet identifier associated with one of the plurality of decoder circuits and configured to provide a key index therefrom;
    a codeword table interface circuit, coupled to the index generation circuit, configured to provide a key request based on the key index; and
    a codeword table circuit, coupled to the codeword table interface circuit, configured to provide secret-keys to an enabled one of the plurality of decoder circuits responsive to the key request.

2. A circuit according to claim 1 wherein the digital broadcast video receiving circuit comprises a set-top box.

3. A circuit according to claim 1 wherein the digital broadcast video receiving circuit comprises a high definition television.

4. A circuit according to claim 1 wherein the digital broadcast video receiving circuit comprises a digital personal video recorder.

5. A circuit according to claim 1 wherein the plurality of encoding formats comprises a Data Encryption Standard (DES), a Triple Data Encryption Standard (TDES), a Common Scramble Algorithm standard (CSA), and/or an Advanced Encryption Standard (AES).

6. A circuit according to claim 1 further comprising:
    a storage device, coupled to the encoding circuit, configured to store the re-encoded digital data packet.

7. A circuit according to claim 1 further comprising:
    an input interface circuit, coupled to the plurality of decoder circuits, configured to provide a packet identifier thereto to enable one of the plurality of decoder circuits with which the packet identifier is associated, and configured to provide the encoded digital broadcast video signal to the one of the plurality of decoder circuits; and wherein the one of the plurality of decoder circuits is further configured to request a secret-key based on the packet identifier to decode the encoded digital broadcast video signal using the secret-key.

8. A circuit according to claim 1 wherein the encoding circuit is further configured to access a secret-key to re-encode the decoded digital data packet using one of the plurality of encoding formats.

9. A circuit according to claim 8 wherein the secret-key is provided via a smart card and/or a random number generator circuit coupled to the digital broadcast video receiving circuit.

10. A circuit according to claim 1 wherein the plurality of decoder circuits further comprise:
a first one of the plurality of decoder circuits comprising an output therefrom coupled to an input of a second one of the plurality of decoder circuits, wherein the first one operates in a bypass mode to pass encoded digital data packets received from a storage device to the encoding circuit; and
wherein the encoding circuit is configured to encode the encoded digital data packets to provide twice encoded digital data packets using a secret-key accessed via a codeword table based on a packet identifier associated with the encoded digital data packets.

11. A circuit according to claim 10 wherein the secret-key comprises a first secret-key and wherein the encoded digital broadcast video signal is encoded using a second secret-key different than the first secret-key.

12. A circuit according to claim 11 wherein a second one of the plurality of decoder circuits is coupled to an output of the first one of the plurality of decoder circuits; and
wherein the first one of the plurality of decoder circuits is configured to decode the twice encoded digital data packets provided from the storage device using the first secret-key to provide once decoded digital data packets to the second one of the plurality of decoder circuits; and
wherein the second one of the plurality of decoder circuits is configured to decode the once decoded digital data packets using the second secret-key to provide the decoded digital data packets.

13. A circuit according to claim 12 wherein the second secret-key is provided via a smart card an/or a random number generator circuit.

14. An apparatus providing conditional access and copy protection comprising:
a decoder circuit;
an input interface circuit, coupled to the decoder circuit, configured to receive encoded digital data packets transmitted according to a digital TV transmission standard, and to output a packet identifier included in the received encoded digital data packets to the decoder circuit;
a secret-key process unit, coupled to the input interface circuit, configured to transmit a first secret-key corresponding to the packet identifier to the decoder circuit, to provide decoded digital data packets from the decoding unit;
a write interface circuit, coupled to the decoder circuit, configured to receive the decoded digital data packets from the decoder circuit and provide the decoded digital data packets based on the packet identifier in response to a record signal;
an encoding circuit, coupled to the write interface circuit, configured to receive the decoded digital data packets from the write interface circuit and to receive a second secret-key associated with the packet identifier from the secret-key process circuit, and further configured to encode the received decoded digital data packets using the second secret-key to provide re-encoded digital data packets to the write interface circuit; and
a storage unit, coupled to the write interface circuit, configured to store/retrieve the re-encoded digital data packets, wherein the secret-key process unit comprises:
an index generation circuit, coupled to the plurality of decoder circuits, configured to receive a packet identifier associated with one of the plurality of decoder circuits and configured to provide a key index therefrom;
a codeword table interface circuit, coupled to the index generation circuit, configured to provide a key request based on the key index; and
a codeword table circuit, coupled to the codeword table interface circuit, configured to provide secret-keys to an enabled one of the plurality of decoder circuits responsive to the key request.

15. A apparatus according to claim 14 wherein the apparatus comprises a set-top box.

16. A apparatus according to claim 14 wherein the apparatus comprises a high definition television.

17. A apparatus according to claim 14 wherein the apparatus comprises a digital personal video recorder.

18. A method for receiving digital broadcast video comprising:
decoding an encoded digital broadcast video signal using one of a plurality of encoding formats used to encode the encoded digital broadcast video signal to provide a digital data packet based on the encoded digital broadcast video signal;
storing/retrieving secret keys that are associated with decoding and encoding; and
encoding the digital data packet to provide a re-encoded digital data packet using a secret key that is retrieved; and
storing the re-encoded digital data in a storage device,
wherein storing/r secret-keys comprises:
generating a key index responsive to receiving a packet identifier that is associated with the digital data packet that is based on the encoded digital broadcast signal;
providing a key request that is based on the key index; and
providing secret-keys to an enabled one of the plurality of decoder circuits responsive to receiving the key request.

19. A method according to claim 18 wherein the plurality of encoding formats comprises a Data Encryption Standard (DES), a Triple Data Encryption Standard (TDES), a Common Scramble Algorithm standard (CSA), and/or an Advanced Encryption Standard (AES).

20. A method according to claim 18 further comprising:
storing the re-encoded digital data packet.

21. A method according to claim 18 further comprising:
storing/retrieving secret keys associated with a plurality of decoder circuits used to decode the encoded digital broadcast video signal.

22. A method according to claim 21 wherein storing/receiving comprises:
receiving a packet identifier associated with one of the plurality of encoding formats and providing a key index therefrom;
providing a key request based on the key index; and
providing secret-keys to an enabled one of the plurality of decoder circuits responsive to the key request.

23. A method according to claim 18 wherein encoding further comprises:
  accessing a secret-key to re-encode the decoded digital data packet using one of the plurality of encoding formats.

24. A method according to claim 23 wherein the secret-key is provided via a smart card and/or a random number generator circuit.

25. A method according to claim 18 wherein decoding further comprises:
  operating in a bypass mode to pass encoded digital data packets received from a storage device; and
  wherein encoding comprises encoding the encoded digital data packets to provide twice encoded digital data packets using a secret-key accessed via a codeword table based on a packet identifier associated with the encoded digital data packets.

26. A method according to claim 25 wherein the secret-key comprises a first secret-key and wherein the encoded digital broadcast video signal is encoded using a second secret-key different than the first secret-key.

27. A method according to claim 26 further comprising:
  decoding the twice encoded digital data packets provided from the storage device using the first secret-key to provide once decoded digital data packets; and
  decoding the once decoded digital data packets using the second secret-key to provide decoded digital data packets.

28. A method for providing conditional access and copy protection to a digital TV signal in an apparatus with a plurality of decoding units and one encoding unit, the method comprising:
  receiving a packet transmitted according to a digital TV transmission standard, and generating an enable signal for enabling a first one of the plurality of decoding units, on the basis of a packet identification included in the received packet;
  receiving a first secret key corresponding to the packet identification included in the received packet, at the first decoding unit enabled in response to the enable signal;
  decoding the packet transmitted according to the digital TV transmission standard at the first decoding unit by using the first secret key;
  outputting the decoded packet from the first decoding unit; and
  receiving a second secret key corresponding to the packet identification included in the decoded packet, and encoding the decoded packet on the basis of the second secret key at the encoding unit,
  wherein the first key corresponds to a key request that is based on a key index that is generated responsive to receiving a packet identifier that is associated with the decoded packet transmitted according to a digital TV transmission standard.

29. A computer program product for receiving digital broadcast video comprising a computer readable medium having computer readable program code embodied therein, the computer readable program product comprising:
  computer readable program code configured to decode an encoded digital broadcast video signal using one of a plurality of encoding formats used to encode the encoded digital broadcast video signal to provide a digital data packet based on the encoded digital broadcast video signal;
  computer readable program code configured to store/retrieve secret keys that are associated with decoding and encoding; and
  computer readable program code configured to encode the digital data packet to provide a re-encoded digital data packet using a secret key that is retrieved; and
  computer readable program code configured to store the re-encoded digital data in a storage device, and
  wherein the computer readable program code configured to store/retrieve the secret-keys comprises:
  computer readable program code configured to generate a key index responsive to receiving a packet identifier that is associated with the digital data packet that is based on the encoded digital broadcast signal;
  computer readable program code configured to provide a key request that is based on the key index; and
  computer readable program code configured to provide secret-keys to an enabled one of the plurality of decoder circuits responsive to receiving the key request.

* * * * *